United States Patent [19]

Kim

[11] Patent Number: 5,693,274
[45] Date of Patent: Dec. 2, 1997

[54] MANUFACTURING METHOD OF PREFROM FOR COMPOSITE MATERIAL OF AUTOMOBILE

[75] Inventor: Jun-Su Kim, Seoul, Rep. of Korea

[73] Assignee: Hyundai Motor Company, Seoul, Rep. of Korea

[21] Appl. No.: 558,260

[22] Filed: Nov. 13, 1995

[30] Foreign Application Priority Data

Dec. 2, 1994 [KR] Rep. of Korea .................. 94-32526

[51] Int. Cl.$^6$ ............................................... B28B 1/26
[52] U.S. Cl. ........................................................ 264/87
[58] Field of Search ........................ 264/87, 86, 635, 264/641

[56] References Cited

U.S. PATENT DOCUMENTS

| | | |
|---|---|---|
| 4,168,950 | 9/1979 | Seemann et al. ............ 431/348 |
| 4,228,826 | 10/1980 | Campbell, Jr. .............. 138/149 |
| 5,078,822 | 1/1992 | Hodges et al. ............. 156/294 |
| 5,147,546 | 9/1992 | Tadayon ..................... 210/506 |
| 5,194,407 | 3/1993 | Waisala et al. ............. 501/32 |

FOREIGN PATENT DOCUMENTS

| | | |
|---|---|---|
| 60-65200 | 4/1985 | Japan. |
| 1-259136 | 10/1989 | Japan. |
| 6-68141 | 8/1994 | Japan. |

*Primary Examiner*—Christopher A. Fiorilla
*Attorney, Agent, or Firm*—Finnegan, Henderson, Farabow, Garrett & Dunner, L.L.P.

[57] ABSTRACT

The present invention relates to a manufacturing method of preform for composite material of automobile, in particular, to an economical and easy mass-production manufacturing method of preform including the steps of manufacturing a wet sheet by pouring a suspension prepared by adding inorganic binder, organic binder and cohesion agent to reinforced fiber, into vacuum suction equipment, and forming the sheet into a cylindrical shape with cylindrical press and deforming the sheet form before drying.

5 Claims, 2 Drawing Sheets

MANUFACTURING METHOD OF PREFROM FOR COMPOSITE MATERIAL OF AUTOMOBILE

FIELD OF THE INVENTION

The present invention relates to a manufacturing method of preform for composite material of automobile, in particular, to an economical and easy mass-production manufacturing method of preform comprising the steps of manufacturing a wet sheet by pouring a suspension prepared by adding inorganic binder, organic binder and cohesion agent to reinforced fibers into vacuum suction equipment, and then being formed into a cylindrical shape by a cylindrical press before drying.

DESCRIPTION OF THE RELATED ART

When an aluminum engine block of automobile is manufactured, ceramic-reinforced metal composite material is used at active part of piston, for its using, bore-shaped preform of reinforcing fibers must be manufactured.

The prior art regarding to the manufacturing method of preform are as follows; Japanese non-examination patent pyong 1-259136 discloses an accumulating method of sludge of reinforcing material as cylindrical, but due to limitation of its thickness, the manufacturing of a cylinder with 4 mm of thickness is impossible. And Japanese non-examination patent sho 60-65200 discloses to use the same method as centrifugal casting by rotating a sludge of reinforcing material as cylinder type. By this method, its outer diameter is even, but its inner surface is not even and regulation of thickness of the inner surface is very difficult.

SAE(Society of Automotive Engineers) 890557 also discloses a forming method with pressure after vacuum adsorption as cylinder type, but this method has a problem which is impossible to work continuously and is difficult to produce in a large scale.

Therefore, inventor of this invention made an effort to solve the problem of the above prior method. As the result, by manufacturing a wet sheet by pouring a suspension prepared by adding inorganic binder etc. to reinforcing fibers into vacuum suction equipment, and then being formed by cylindrical press before drying, this invention is completed.

The object of this invention is to provide an economical and easy to mass-produce manufacturing method of preform for composite material of automobile prepared by manufacturing a wet sheet and forming with pressure as cylinder type.

SUMMARY OF THE INVENTION

The present invention relates to a manufacturing method of preform which is characterized in manufacturing a wet sheet by pouring, suspension prepared by adding inorganic binder etc. to reinforced fiber, into vacuum filtrate dehydration equipment, and forming with cylindrical press and deforming the sheet form before drying.

DETAILED DESCRIPTION OF THE INVENTION

The present invention relates to a manufacturing method of preform for composite material of automobile which is characterized in manufacturing a wet sheet by pouring a, suspension prepared by adding 1 to 5 weight part of inorganic binder, 0.2 to 7 weight part of organic binder and 0.02 to 5 weight part of cohesion agent to 100 weight part of fibers, into vacuum suction equipment, and forming with cylindrical press before drying.

The more detailed method of this invention is as follows.

This invention relates to an economical and easy mass-production manufacturing method of preform which is manufactured by preparing a wet sheet and then forming the sheet into a cylindrical shape by pressing with pressure as cylindrical type.

As a reinforced fiber in this invention, 1–2 species selected from the group of alumina($Al_2O_3$) short fiber, SiC whisker, $Si_3N_4$, $K_2O \cdot 6TiO_2$, carbon and $9Al_2O_3 \cdot 2B_2O_3$ are used.

And as organic binder, cation starch, anion starch or latex are used within 0.2 to 7 weight part for 100 weight part of reinforced fiber.

As inorganic binder, colloidal silica or colloidal alumina are used within 1 to 5 weight part.

And as cohesion agent, 0.02 to 5 weight part of polyacrylamide is used. If the content of said components is above or below these ranges, its dehydration is impossible when vacuum filtrate dehydration is proceeded or a crevice at preform is created when forming with pressure is proceeded.

Figure 1:
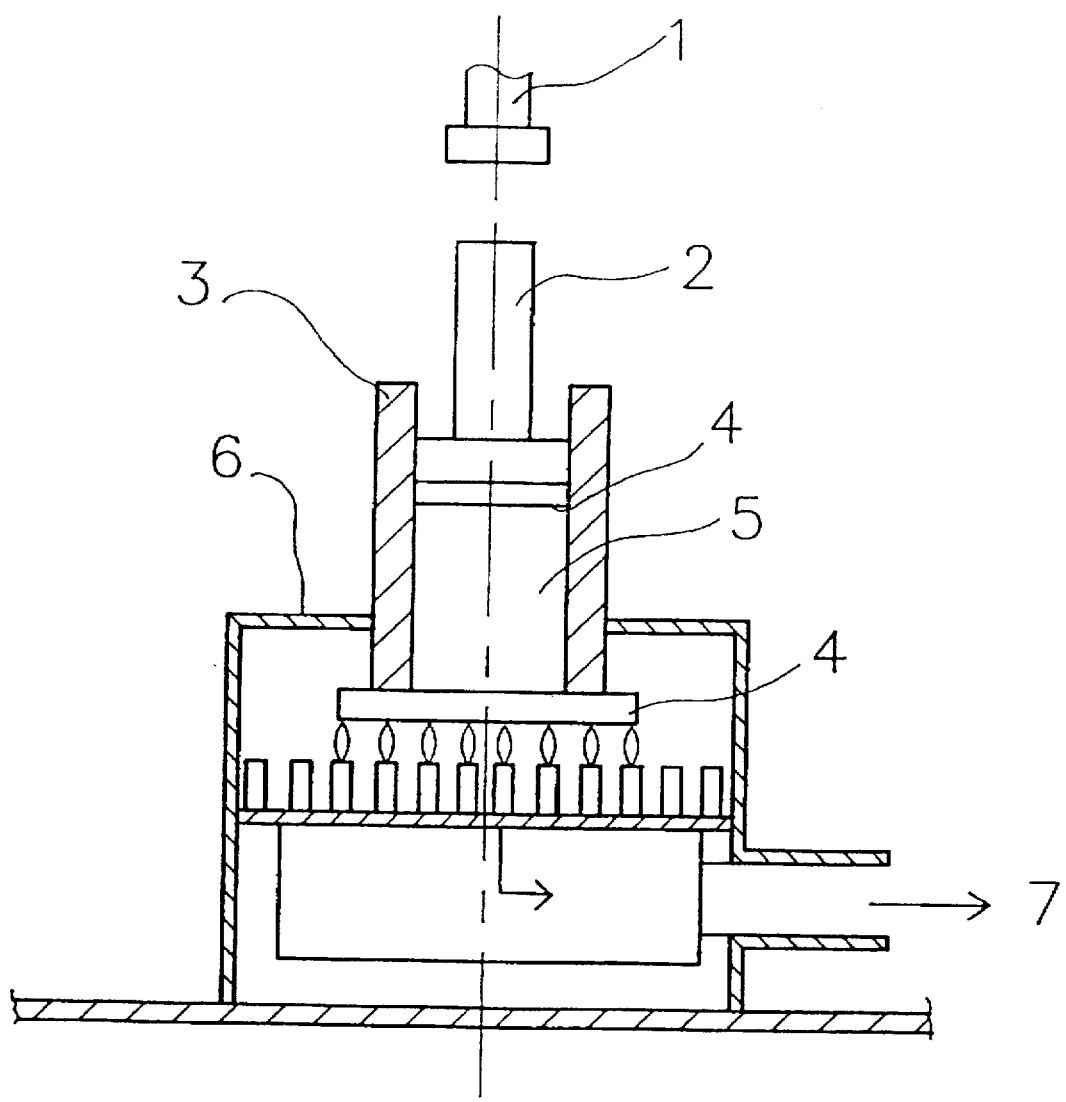
FIG. 1 shows a sectional view of vacuum filtrate dehydration equipment used in this invention.

A suspension prepared by adding the above components is poured into vacuum filtrate dehydration equipment of FIG. 1, and sheet form as wettable status is manufactured. The workable principle of vacuum filtrate dehydration equipment is as follows. If the suspension is poured into metal mold and dehydrated, the filtrate is dehydrated through filter(4).

And then, in some existence of water, by pressurizing press working punch(2) to definite position, a volume fraction of sheet is regulated and after enough dehydration, sheet is separated from metal mold.

Figure 2:
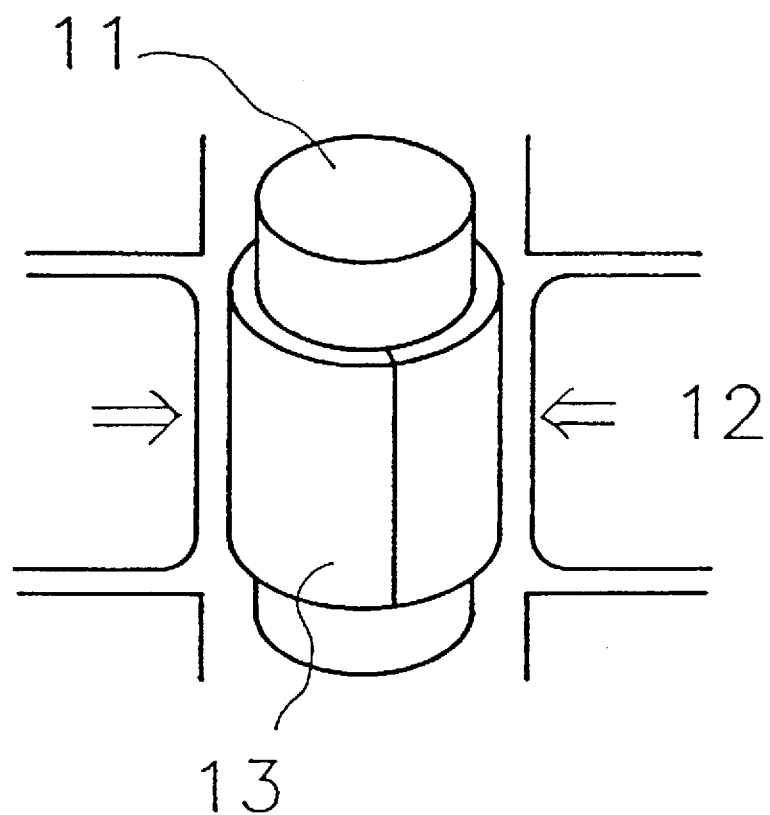
FIG. 2 shows a front view of cylindrical press used in this invention.

And before the sheet formed by said method is dried, the sheet is pressed with the cylindrical press of FIG. 2 and deformed into a cylindrical shaped preform. The workable principle of above cylindrical press is as follows.

After winding a sheet preform around a core(11), in a metal mold the surface is pressed with rubber press, thereby fixing the volume fraction of the final preform. The cylindrical preform is then dried sufficiently. After drying, core (11) and preform(13) are separated from the press equipment and then preform(13) is separated from metal mold in core(11).

As mentioned above, this invention relates to a manufacturing method of preform for composite material of automobile which the sheet is manufactured as wettable status and then formed with pressure into cylindrical shape. Because the production of sheet is continuous, this method is economical and easy to manufacture in a large scale. The present invention is represented by the Examples below, which are intended to be exemplary only.

EXAMPLE 1

100 g of alumina($Al_2O_3$) SAFFIL® fiber was dispersed in 1 l of distilled water and 1 wt % of colloidal silica was added. And then 0.5 wt % of cation starch and 0.1 wt % of polyacrylamide were added, and were stirred at 2000 rpm for 2 minutes.

The manufactured suspension was poured into a vacuum filtrate dehydration equipment of FIG. 1 and by vacuum suction, a wet sheet preform was formed.

Before the preform was dried, the preform was pressed into a cylindrical shape with cylindrical press of FIG. 2 and deformed into the cylindrical preform [inner diameter: 78 mm, outer diameter 88 mm(thickness: 4 mm), height: 144 mm]

EXAMPLE 2

53.7 g of alumina($Al_2O_3$) SAFFIL® fiber and 46.3 g of SiC whisker were dispersed in 1 l of distilled water and 1 wt % of colloidal silica was added. And then 0.5 wt % of cation starch and 0.1 wt % of polyacrylamide were added, and were stirred at 2000 rpm for 2 minutes.

The manufactured suspension was poured into vacuum suction equipment of FIG. 1 and by vacuum suction, a wet preform in the form of a sheet was formed.

Before the preform was dried, the preform was pressed into a cylindrical shape with cylindrical press of FIG. 2 and deformed into a cylindrical preform [inner diameter: 78 mm, outer diameter 88 mm(thickness: 4 mm), height: 144 mm].

What is claimed is:

1. A method of manufacturing a cylindrical composite material preform comprising, forming a wet sheet by pouring a suspension prepared by adding 1 to 5 weight part of inorganic binder, 0.2 to 7 weight part of organic binder, 0.02 to 5 weight part of cohesion agent, and 100 weight part of fiber to distilled water into vacuum suction equipment, vacuum forming said suspension into a sheet of composite material, removing said sheet from said vacuum suction equipment, wrapping said sheet around a core, placing said sheet into a cylindrical press, and deforming the sheet into a cylindrical form before drying.

2. The manufacturing method according to claim 1, wherein said reinforced fiber is one or two selected from the group of alumina($Al_2O_3$) short fiber, SiC whisker, $Si_3N_4$, $K_2O.6TiO_2$, carbon and $9Al_2O_3.2B_2O_3$.

3. The manufacturing method according to claim 1, wherein said inorganic binder is colloidal silica or colloidal alumina.

4. The manufacturing method according to claim 1, wherein said organic binder is cation starch or anion starch.

5. The manufacturing method according to claim 1, wherein said cohesion agent is polyacrylamide.

* * * * *

UNITED STATES PATENT AND TRADEMARK OFFICE
CERTIFICATE OF CORRECTION

PATENT NO. : 5,693,274
DATED : December 2, 1997
INVENTOR(S) : Jun-Su KIM

It is certified that error appears in the above-identified patent and that said Letters Patent is hereby corrected as shown below:

On the title page item [54],

Line 1, change "Prefrom" to --Preform--.

In the Claims:
Claim 2, column 4, line 13, change "$K_2O.6TiO_2$" to --$K_2O \cdot 6TiO_2$--; and change "$9Al_2O_3.2B_2O_3$" to --$9Al_2O_3 \cdot 2B_2O_3$--.

Signed and Sealed this

Third Day of March, 1998

*Attest:*

BRUCE LEHMAN

*Attesting Officer*     *Commissioner of Patents and Trademarks*